United States Patent
Lowe et al.

(10) Patent No.: US 12,428,030 B2
(45) Date of Patent: Sep. 30, 2025

(54) VEHICLES, METHODS, AND COMPUTER-READABLE MEDIA FOR MITIGATING PARKING AREA DAMAGE DURING THERMAL EVENT OF BATTERY

(71) Applicant: GM GLOBAL TECHNOLOGY OPERATIONS LLC, Detroit, MI (US)

(72) Inventors: Dexter C. Lowe, Macomb, MI (US); Mirna Neves, Windsor (CA); Esteban Camacho, Belleville, MI (US); Ryan P. Hickey, Austin, TX (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 18/311,275

(22) Filed: May 3, 2023

(65) Prior Publication Data

US 2024/0367684 A1    Nov. 7, 2024

(51) Int. Cl.
*B60W 60/00* (2020.01)
*B60L 58/24* (2019.01)

(52) U.S. Cl.
CPC ....... *B60W 60/00186* (2020.02); *B60L 58/24* (2019.02)

(58) Field of Classification Search
CPC ....... B60W 60/00186; B60L 2510/246; B60L 58/24; B60L 3/00; B60K 28/10
See application file for complete search history.

(56) References Cited

U.S. PATENT DOCUMENTS

| | | | |
|---|---|---|---|
| 4,350,026 A | 9/1982 | Klein | |
| 6,889,515 B2 | 5/2005 | Tilton et al. | |
| 6,955,063 B2 | 10/2005 | Adiga et al. | |
| 8,329,325 B2 | 12/2012 | Brodie et al. | |
| 8,383,260 B2 | 2/2013 | Essinger et al. | |
| 8,429,899 B2 | 4/2013 | Gonze et al. | |
| 8,435,668 B2 | 5/2013 | Kumar et al. | |
| 8,563,154 B2 | 10/2013 | Graban et al. | |
| 8,852,772 B2 | 10/2014 | McDonald | |
| 8,951,654 B2 | 2/2015 | Sachdev et al. | |
| 9,193,232 B2 | 11/2015 | Huntzicker | |

(Continued)

*Primary Examiner* — James J Lee
*Assistant Examiner* — Jonathan E Reinert
(74) *Attorney, Agent, or Firm* — Quinn IP Law

(57) ABSTRACT

Presented are intelligent vehicle systems for automating thermal event mitigation for fully or partially enclosed vehicles, methods for making/using such systems, and vehicles equipped with such systems. A method of controlling operation of a vehicle includes a vehicle controller confirming the subject vehicle is parked and, once confirmed, responsively evaluating vehicle data indicating the vehicle is at least partially enclosed in a parking area and, thus, is in a vehicle parked in enclosed space (VPES) state. After determining the vehicle is both parked and in a VPES state, the controller detects a thermal event in a battery cell of the vehicle's battery system. Upon detection of the thermal event, the controller responsively determines path plan data with a designated route for extricating the vehicle from the parking area. The controller then commands the vehicle's autonomous driving system to execute control operations maneuvering the vehicle away from the parking area.

20 Claims, 2 Drawing Sheets

(56) References Cited

U.S. PATENT DOCUMENTS

| | | |
|---|---|---|
| 9,196,939 B2 | 11/2015 | Christian et al. |
| 9,533,600 B1 | 1/2017 | Schwab et al. |
| 9,689,624 B2 | 6/2017 | Timmons et al. |
| 9,851,654 B2 | 12/2017 | Bryant et al. |
| 10,003,112 B1 | 6/2018 | Boor et al. |
| 10,270,123 B2 | 4/2019 | Schilder et al. |
| 10,923,287 B1 | 2/2021 | Coppola et al. |
| 11,167,643 B2 | 11/2021 | Li et al. |
| 11,387,505 B2 | 7/2022 | Hickey et al. |
| 11,450,920 B2 | 9/2022 | Hamelin et al. |
| 2009/0249807 A1 | 10/2009 | Nemesh et al. |
| 2011/0200860 A1 | 8/2011 | Brodie et al. |
| 2016/0090105 A1* | 3/2016 | Neubecker ............... A62C 3/07 701/1 |
| 2017/0253141 A1 | 9/2017 | Hsu et al. |
| 2019/0357386 A1 | 11/2019 | Coppola et al. |
| 2020/0388893 A1 | 12/2020 | Schoenherr et al. |
| 2021/0143652 A1 | 5/2021 | Ressler et al. |
| 2021/0234209 A1 | 7/2021 | Wang et al. |
| 2022/0097562 A1* | 3/2022 | Li ........................... B60L 15/20 |
| 2022/0102780 A1 | 3/2022 | Hickey et al. |
| 2022/0223936 A1 | 7/2022 | Garrick et al. |
| 2023/0166724 A1* | 6/2023 | Wang ..................... B60L 53/22 701/22 |

\* cited by examiner

VEHICLES, METHODS, AND COMPUTER-READABLE MEDIA FOR MITIGATING PARKING AREA DAMAGE DURING THERMAL EVENT OF BATTERY

INTRODUCTION

The present disclosure relates generally to electrochemical devices. More specifically, aspects of this disclosure relate to smart vehicle systems and control logic for detecting and responding to severe thermal events in rechargeable traction battery packs.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle at desired speeds and ranges, contemporary traction battery packs group multiple battery cells (e.g., 8-16+ cells/stack) into individual battery modules (e.g., 10-40+ modules/pack) that are electrically interconnected and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and an AC-DC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise and may push the battery assembly towards an unstable state. Such thermal events, if left unchecked, may lead to a more accelerated heat-generating state called "thermal runaway," a condition in which the battery system is incapable of returning the internal battery components to normal operating temperatures. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels and pipes within the battery case. In contrast, direct liquid cooling systems—or "liquid immersion cooling" (LIC) systems—immerse the battery cells within a direct-conduction liquid dielectric coolant.

SUMMARY

Presented herein are intelligent vehicle systems with attendant control logic for automating thermal event mitigation for fully or partially enclosed vehicles, methods for manufacturing and methods for operating such systems, and motor vehicles equipped with such systems. For example, intelligent vehicle systems are disclosed for predicting the onset of a thermal event in one or more battery cells of an in-vehicle battery pack while detecting a vehicle parked in enclosed space (VPES) scenario. An onboard vehicle sensing and control network monitors for and senses an oncoming or active thermal runaway (TR) event while concurrently sensing the vehicle has come to a stop and is at least partially enclosed by a surrounding structure (e.g., residential or commercial garage, carport, barn, OEM warehouse, dealership lot, etc.). The TR event mitigation protocol reduces the likelihood of the thermal event impacting surrounding structures (e.g., owner's domicile) and nearby objects (e.g., neighboring vehicles), especially events that may burn or damage those structures/objects. Upon detection of a TR event concurrent with a VPES scenario, the mitigation protocol automates extrication of the host vehicle from the surrounding structure/objects and relocates the vehicle to a designated secure location selected to mitigate/prevent damage to adjacent structures. During automated extrication, the host vehicle may be reoriented to optimize vehicle access for first responders, e.g., facilitating access to a flood port or the battery pack for quenching. The event mitigation protocol may also aggregate real-time geolocation data, geospatial data, atomic time data, individualized vehicle and user data, etc., to derive a projected path plan to bring the host vehicle out of urban/congested areas to a designated secure zone or to a nearest first responder location.

Attendant benefits for at least some of the disclosed concepts include smart control systems and programmable logic that provision thermal event detection and mitigation for a host vehicle that is in an at least partially enclosed area. Establishing host vehicle location and enclosure proximity during a thermal runaway event enables the host vehicle to quickly and effectively vacate the area and enables first responders to appropriately prepare for and respond to the exigent situation. The host vehicle, either directly or through a third-party vehicle service provider, may also broadcast visual and/or audible alerts to help building occupants and bystanders clear the area as they may not be aware of the oncoming/active thermal runaway event.

Aspects of this disclosure are directed to intelligent vehicle control systems, system control logic, and memory-stored instructions for mitigating thermal events during a VPES scenario. In an example, a method is presented for operating a host vehicle with a battery system, an autonomous driving system, and a resident or remote controller or module or network of controllers/modules (collectively "controller"). This representative method includes, in any order and in any combination with any of the above and below disclosed options and features: determining e.g., via the vehicle controller communicating with a PCM or Transmission Range Sensor (TRS) Circuit (PRNDL), the host vehicle is in a parked state; receiving, e.g., from a distributed network of resident or remote sensing devices by the controller responsive to determining the host vehicle is parked, vehicle data indicating the host vehicle is at least partially enclosed in a parking area and, thus, is in a VPES state; detecting, e.g., via the controller communicating with an EBCM after determining the host vehicle is both parked and in a VPES state, a predicted onset or occurrence of a thermal event in at least one battery cell of the vehicle's battery system; determining, e.g., using map and road condition data, vehicle state and dynamics sensors, geolocation information, etc., via the controller responsive to detection of the thermal event, path plan data with a designated route for extricating the host vehicle from the parking area; and transmitting, e.g., via the controller to the vehicle's autonomous driving system, one or more command signals to execute one or more vehicle control operations to maneuver the host vehicle away from the parking area along the designated route.

Aspects of this disclosure are also directed to computer-readable media (CRM) for mitigating thermal events during a VPES scenario. In an example, a non-transitory CRM stores instructions that are executable by one or more processors of a vehicle controller. When executed by the processor(s), these instructions cause the controller to perform operations, including: determining the host vehicle is in a parked state; receiving, responsive to determining the host vehicle is in the parked state, vehicle data indicating the host vehicle is in a VPES state in which the host vehicle is at least partially enclosed in a parking area; detecting, after determining the host vehicle is in both the parked state and the VPES state, a predicted onset or occurrence of a thermal event in at least one battery cell of the vehicle's battery system; determining, responsive to detection of the thermal event, path plan data with a designated route for extricating the host vehicle from the parking area; and commanding the vehicle's autonomous driving system to execute a vehicle control operation maneuvering the host vehicle away from the parking area along the designated route.

Additional aspects of this disclosure are directed to motor vehicles with intelligent vehicle systems executing control logic for mitigating thermal events during VPES scenarios.

As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, etc. In an example, a vehicle includes a vehicle body with a passenger compartment, multiple road wheels mounted to the vehicle body (e.g., via corner modules coupled to a unibody or body-on-frame chassis), and other standard original equipment. For electric-drive applications, one or more electric traction motors operate alone (e.g., for FEV powertrains) or in conjunction with an internal combustion engine (e.g., for HEV powertrains) to selectively drive one or more of the road wheels to propel the vehicle. A vehicle battery system containing multiple battery cells is mounted onto the vehicle and operable to power the traction motor(s). An autonomous driving system (e.g., on-vehicle sensor network, ADAS ECU, steering, braking, and shifting actuators, etc.) is operable to automate vehicle control operations.

Continuing with the preceding discussion, the vehicle is also equipped with a vehicle controller (e.g., single controller, network of controllers, resident/remote controller or module, etc.) that is programmed to determine whether or not the subject vehicle is in a parked state. If it is, the controller responsively aggregates and analyzes vehicle data indicating the motor vehicle is at least partially enclosed in a parking area and, thus, is in a VPES state. While the subject vehicle is both parked and in a VPES state, the controller monitors the vehicle battery system to predict or sense the onset of a thermal event in at least one of the battery system's battery cells. Upon detection of a thermal event, the controller determines path plan data with a designated route for extricating the motor vehicle from the parking area. Using this path plan data, the controller transmits one or more command signals to the vehicle's autonomous driving system to execute one or more control operations to maneuver the subject vehicle away from the parking area.

For any of the disclosed vehicles, methods, and CRM, the vehicle may store, e.g., in a resident or remote memory device prior to the host vehicle being parked, final maneuver data indicative of driving maneuvers executed via the host vehicle to park in the parking area. In this instance, the controller may respond to detection of a thermal event by retrieving the final maneuver data from the memory device and using this data to determine the path plan data. As another option, the vehicle controller may respond to detection of a thermal event by commanding the vehicle's door lock system to lock or retain locked some or all of the vehicle doors. Prior to executing the vehicle-extracting control operation(s), the controller may aggregate and analyze sensor data to determine whether or not the parking area has a garage door and/or determine the garage door's operating state (open/closed). Upon detection of the garage door and/or its operating state, the vehicle controller may responsively transmit an open signal to a garage door opener to open the garage door. As another option, the vehicle controller may analyze received sensor data to detect physical obstructions, if any, that are at least partially blocking the vehicle's extraction route. Responsive to detection of a physical obstruction, the controller may command the autonomous driving system to suspend execution of some or all vehicle-extracting control operations.

For any of the disclosed vehicles, methods, and CRM, determining path plan data may simply encompass identifying an optimal end location that is at least a preset minimum distance (e.g., 10 meters) from the parking area. In this instance, the vehicle controller may command the autonomous driving system to execute one or more associated vehicle control operations to stop the host vehicle at the optimal end location. As another option, determining path plan data may also include determining an optimal vehicle orientation at which the vehicle's battery system is readily accessible when the host vehicle is stopped at the optimal end location. In this instance, the vehicle controller may command the autonomous driving system to execute one or more vehicle control operations to position the vehicle in the optimal orientation when stopped at the optimal end location. As yet another option, controller-received vehicle data may contain geospatial data that indicates the parking area is in an urban or congested area. In this instance, the optimal end location may be a predefined or dynamically derived "secure" location that is outside a predefined proximity of the urban or congested area (e.g., one mile past city limits).

For any of the disclosed vehicles, methods, and CRM, the vehicle controller may aggregate and analyze sensor data received from an on-vehicle network of vehicle sensors (e.g., cameras, LiDAR, radar, ultrasonic, etc.) to detect target objects proximate the host vehicle (e.g., nearby pedestrians, vehicles, homes, pets, etc.) after the host vehicle is extricated from the parking area. In this instance, the controller may dynamically determine or modify the optimal end location based, at least in part, on the received sensor data. Upon detection of a thermal event, the vehicle controller may responsively automate output of an electronic notification of the thermal event to an owner or possessor (e.g., lessee, renter, etc.) of the host vehicle. In some instances, the controller may then receive an override signal indicative of an override request from the vehicle owner/possessor to deny execution of the vehicle control operation(s) by the autonomous driving system. As another option, a detected thermal event may take on various forms, including a thermal runaway event in which at least one of the battery cells is in an uncontrolled heat-generating cycle that is causing an unstable, self-heating state within the vehicle battery system.

For any of the disclosed vehicles, methods, and CRM, the vehicle controller may respond to detection of a thermal event by transmitting one or more activation signals to a lighting component (e.g., vehicle headlamps, brake lights, turn signals, electronic displays, etc.) and/or an audio component (vehicle horn, passenger-cabin speaker system, etc.) of the host vehicle to generate a predefined visible and/or audible output to alert individuals proximal the host vehicle of the thermal event. Optionally, the controller may respond to detection of a thermal event by commanding a centerstack telematics unit of the host vehicle to automate transmission of a notification of the thermal event and a real-time location of the host vehicle to a first responder and/or a remote vehicle service center.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
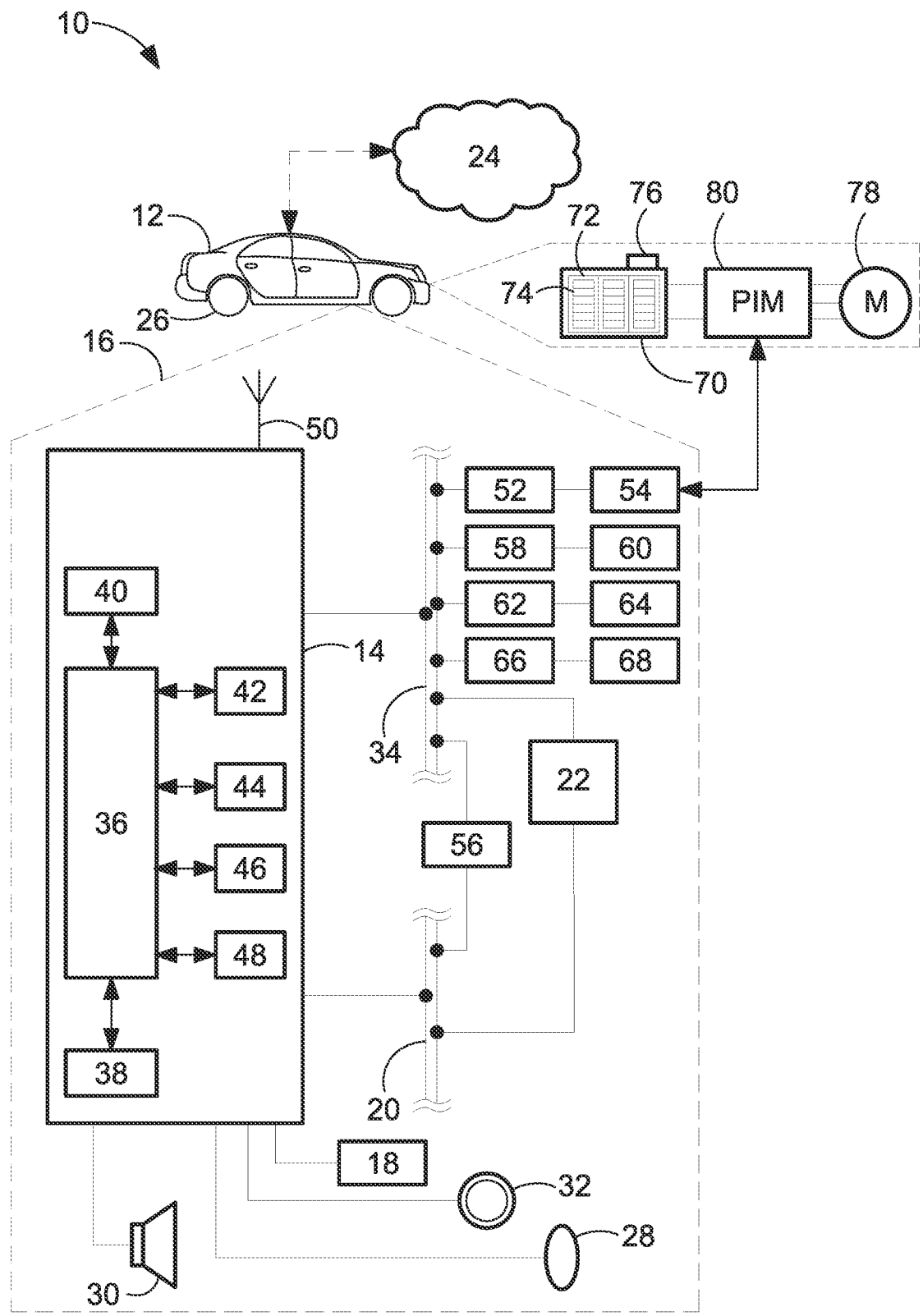
FIG. 1 is a partially schematic, side-view illustration of a representative motor vehicle with an electrified powertrain, a rechargeable battery pack, and a network of in-vehicle controllers, sensing devices, and communication devices for automating thermal event detection and mitigation in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, may be incorporated into any logically relevant type of vehicle, and may be employed for various types of VPES scenarios (e.g., open-type and closed-type garage structures, carports, pole barns, building-gap and confined-alley parking, etc.). Moreover, only select components of the motor vehicles and intelligent vehicle control systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a centerstack telecommunications and information ("telematics") unit 14 that wirelessly communicates, e.g., via cell towers, base stations, mobile switching centers, satellite service, UWB, DSRC, etc., with a remotely located cloud computing host service 24 (e.g., ONSTAR® or MYGMC®). Some of the other in-vehicle hardware components 16 shown in FIG. 1 include, as non-limiting examples, an electronic video display device 18, a microphone 28, audio speakers 30, and assorted user input controls 32 (e.g., buttons, knobs, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with means to input verbal or other audible commands. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is the network connection interface 34, suitable examples of which include twisted pair/fiber optic Ethernet switches, parallel/serial communications buses, local area network (LAN) interfaces, controller area network (CAN) interfaces, and the like. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, a motor control module (MCM) 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), Onboard Charging Module (OBCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to an IC real-time clock (RTC) 42 and one or more electronic memory devices 38, each of which may take on the form of a CD-ROM, magnetic disk, integrated circuit (IC) device, solid-state drive (SSD) memory, hard-disk drive (HDD) memory, flash memory, semiconductor memory (e.g., various types of RAM or ROM), etc.

Long-range communication (LRC) capabilities with off-board devices may be provided via one or more or all of a cellular communication chipset/component, a navigation and location chipset/component (e.g., global positioning system (GPS) transceiver), or a wireless modem, all of which are collectively represented at 44. Short-range communication (SRC) may be provided via a close-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

To propel the motor vehicle 10, an electrified powertrain is operable to generate and deliver tractive torque to one or more of the vehicle's drive wheels 26. The powertrain is generally represented in FIG. 1 by an electric traction motor 78 that is operatively connected to a rechargeable energy storage system (RESS), which may be in the nature of a chassis-mounted traction battery pack 70. The traction battery pack 70 may contain one or more battery modules 72 each housing a group of electrochemical battery cells 74, such as lithium ion, lithium polymer, or nickel metal hydride battery cells of the pouch, can, or prismatic type. One or more electric machines, such as a polyphase, permanent magnet motor/generator (M) unit 78, draw electrical power from and, optionally, deliver electrical power to the battery pack 70. An HC electrical system with a power inverter module (PIM) 80 electrically connects the battery pack 70 to the motor/generator unit(s) 78 and modulates the transfer of electrical current therebetween. The battery pack 70 may be configured such that module management, cell sensing, and module-to-module or module-to-host communications functionality is integrated directly into each module 72 and performed wirelessly via a wireless-enabled cell monitoring unit (CMU) 76.

Discussed below are intelligent vehicle control systems executing memory-stored programmable logic in order to automate thermal event detection and mitigation during a VPES scenario. In a non-limiting example, systems and methods employ vehicular automation, learned "last mile" maneuvers, SRC and LRC radio frequencies, user-selected vehicle settings, etc., to move a thermally compromised vehicle to a preset or dynamically derived "secure" location. Disclosed thermal event mitigation protocols may be scaled and adapted to assist electrified vehicles and internal combustion vehicles alike so long as the host vehicle is capable of supporting core enablers and provision a minimum level of automated maneuverability (e.g., SAE J3016 Level 3 driving automation). When a thermal runaway event initiates or is predicated as imminent, for example, the vehicle control system maneuvers the host vehicle away from target objects (e.g., nearby homes, pedestrians, vehicles, structures, etc.).

A confidence algorithm may be employed to decide when to move to a "secure spot" based, for example, on the time of day, real-time vehicle start location, learned parking habits, etc. In a similar regard, a "rendezvous point" algorithm may be employed to dynamically create a designated location away from urban areas, other vehicles, bystanders, vegetation, etc. The host vehicle may enable an audible indication (e.g., using external speakers to output a prompt) or a visual indication (e.g., LED text, etc.) to inform first responders where is the thermal event and/or a flood port for quenching the battery pack/module/cell. This feature may be engaged once advisors confirm that first responders have arrived at the secure location of the host vehicle. The thermal event mitigation protocol may determine whether or not a severity of the event has reached a preset threshold and, as such, the vehicle should forcibly drive through a garage door or other obstruction.

On-vehicle cameras, detection and ranging LiDAR, ultrasonic proximity monitoring, and other sensors may be employed to evaluate the parking area and surrounding conditions when the host vehicle enters the area (e.g., if parked at midnight in suburban neighborhood, not likely to have pedestrians or third-party vehicles parked outside between 1 and 5 AM when determining where to "aim" the exit). For robust low-level thermal event detection, such as a potential but not imminent TR event, the host vehicle may allow access to the passenger compartment, e.g., by unlocking a vehicle door, so a person may manually move the vehicle. An optimal vehicle orientation may be derived to position the host vehicle at the designated secure zone in such a manner that ensures first responders can access the battery system and/or pack flood port. If early detection occurs for an imminent thermal event, a vehicle secure zone may be defined by geographical location for bringing the host vehicle closer to first responders (e.g., nearest the fire department) and/or away from congested areas with structures and bystanders.

A vehicle owner, lessee, renter, possessor, etc. (collectively "user") may access a one-time thermal event mitigation response setup menu during which the user selects a secure location on or near their property. The user may be prompted to acknowledge responsibility for the selected location. As another setup option, the user may program garage opener settings and home security settings, such as in-vehicle radio signal programming or smart-home IoT device protocols. It is within the scope of this disclosure that many of the automated thermal-event-mitigating responses be selected or modified by a vehicle user. For instance, a new vehicle setup routine may prompt a vehicle owner/driver to select thermal event mitigation preferences/options via a dedicated mobile app, information head unit (IHU), or web portal. These options may include entering general information, such as parking area or garage size, layout, and exit/entry points, garage door make/model/programming, home and driveway information, etc., and thermal event response preferences, such as a designated secure location, override options, door lock preferences, etc.

When the host vehicle is parked, turned off, and vacated, the control system monitors the vehicle battery system, high-voltage electrical system, and other heat-generating components for a severe thermal event. At the onset of a thermal event mitigation protocol, the host vehicle may track and store final "last mile" maneuvers before parking at a domicile or other enclosed space. A detected TR event may trigger the vehicle door locks to secure the host vehicle and prevent the user from entering the vehicle; the garage door, if any, is opened. A passenger-cabin telematics device may initiate a call to a first responder or BO vehicle host service to alert them of the TR event; the host vehicle will concurrently extract itself from the enclosed parking location. Prior to, contemporaneous with, or after vehicle extraction, electronic notifications may be sent to the vehicle user alerting them that the vehicle has/will deploy thermal event remediation maneuvers. Audible and/or visible warnings may be broadcast to nearby parties alerting them of the event. Tracked pre-park maneuvers may be retrieved from onboard or offboard storage, e.g., via the telematics device, to facilitate vehicle extrication.

Select "extreme" use-case scenarios, such as a severe TRP event or a combusted gas tank, may enable a BO vehicle services adviser to execute a "hostile" takeover and extraction that may involve breaking through a closed garage door and/or submerging the vehicle. Upon extrication, the host vehicle self-parks at a designated "secure" location that is at least a predefined distance from the domicile. The host vehicle may automatically orient itself in an optimal orientation such that first responders can quickly and easily access the vehicle, battery pack, flood port, etc. Audible and/or visible prompts may be employed by the host vehicle to direct a first responder to the flood port. For instances in which the host vehicle is located in a congested area or city, the vehicle may be driven to a designated secure location based on a geographical location outside of the congested areas to move the vehicle farthest from large buildings/populations.

Figure 2:
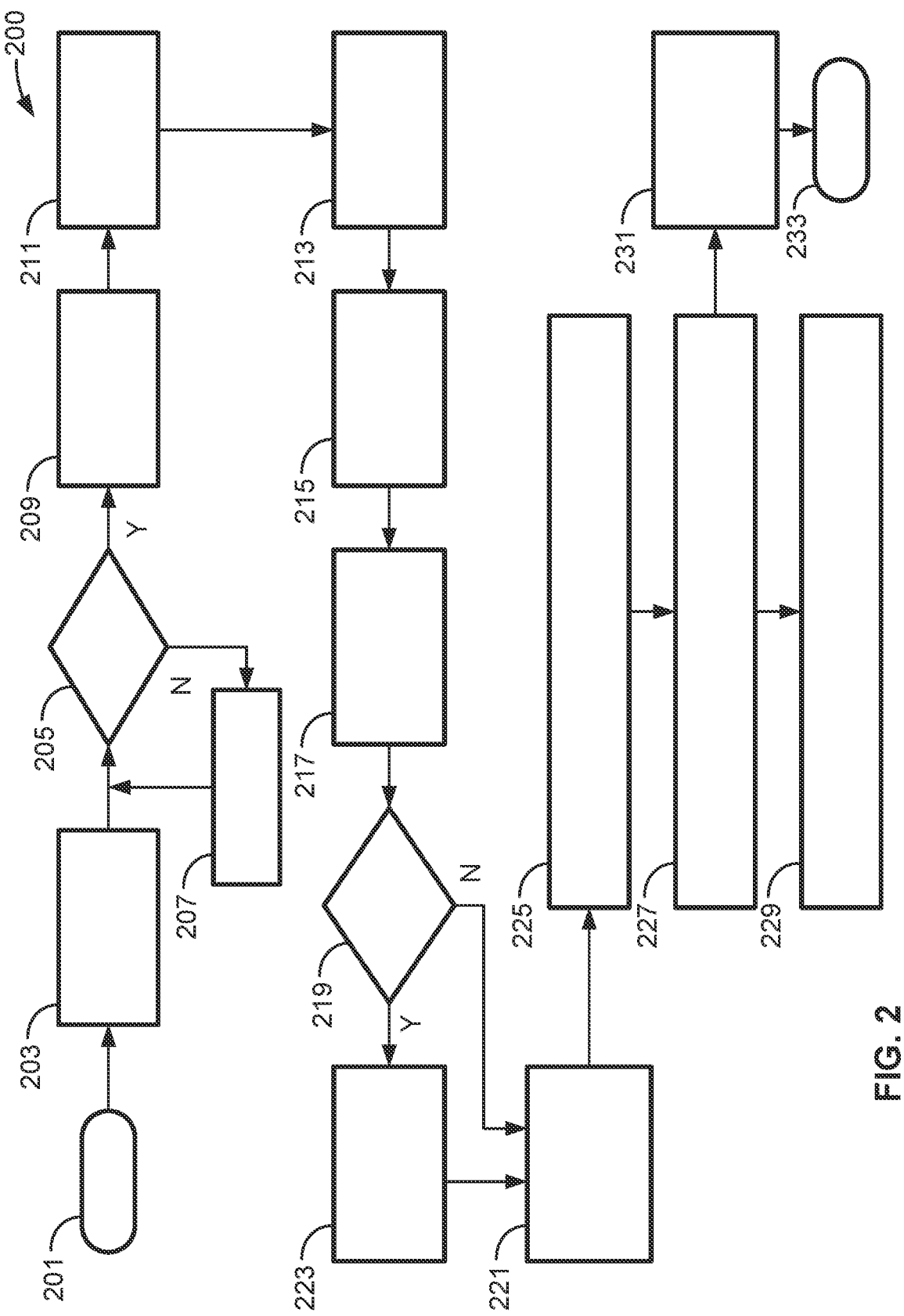
FIG. 2 is a flowchart illustrating a representative VPES control protocol for mitigating thermal events in a vehicle that is parked in an at least partially enclosed space, which may correspond to memory-stored instructions that are executable by a resident or remote controller, control-logic circuit, programmable control unit, or other integrated circuit (IC) device or network of devices in accord with aspects of the disclosed concepts.

With reference next to the flow chart of FIG. 2, an improved method or control strategy for automated thermal event sensing and mitigation of a host vehicle, such as automobile 10 of FIG. 1, during a VPES scenario, such as parking in a residential garage, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., memory device 38 of FIG. 1), and executed, for example, by an electronic controller, processing unit, dedicated control module, logic circuit, or other module or device or network of modules/devices (e.g., CPU 36 and/or vehicle host service 24 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for a programmable controller or control module or similarly suitable processor to call up an initialization procedure for a VPES control protocol. This routine may be executed in real-time, near real-time, continuously, systematically, sporadically, and/or at regular intervals, for example, each 10 or 100 milliseconds during regular and routine operation of the motor vehicle 10. As yet another option, terminal block 201 may initialize responsive to a user command prompt (e.g., via input controls 32), a resident vehicle controller prompt (e.g., from CPU 36 or EBCM 56), or a broadcast prompt signal received from a centralized back-office (BO) vehicle services system (e.g., host cloud computing service 24). By way of non-limiting example, the method 200 may automatically initialize in response to detection of a user keying-off the host vehicle, parking and vacating the host vehicle, or manually or audibly selecting a VPES option for the host vehicle prior to or after vacating the passenger cabin. Upon completion of some or all of the control operations presented in FIG. 2, the method 200 may advance to END terminal block 233 and temporarily terminate or, optionally, may loop back to terminal block 201 and run in a continuous loop.

Advancing from terminal block 201 to FINAL MANEUVERS predefined process block 203, the method 200 tracks a host vehicle's maneuvers and associated operations before parking at a domicile or other enclosed space. For instance, the host vehicle CPU 36 may communicate with the GPS transceiver 44 and resident dynamics sensors 66, 68 to collect data indicative of a route used to enter a garage, a location and orientation of the vehicle within the garage, a topography of a driveway leading to/from the garage, etc. CPU 36 may also communicate with the on-vehicle camera(s) 62 and range sensor(s) 64 to collect data indicative of a garage size, layout, type, etc. (e.g., residential garage, carport, pole barn, other) and/or a presence and state of a garage door (roll-up, bifold, open, closed, partially open, etc.). Once collected, this data may be stored in resident memory (e.g., memory device 38) or remote memory (e.g., cloud computing host service 24) for subsequent user to facilitate vehicle extrication. When the vehicle ignition is turned off (e.g., via a driver manually depressing an ignition start/stop button), final maneuver data collection may be provisionally suspended and any VPES-related vehicle parameter data written to an allocated data buffer or other cache memory.

At this juncture, the method 200 may also determine whether or not the host vehicle is in a parked state and, if so, whether or not the host vehicle is at least partially enclosed in the parking area and, thus, is in a VPES state. Verifying a parked state may include receiving idle state feedback data from one or more vehicle dynamics sensor, parked state feedback data from an electronic shift knob/dial, off state feedback data from a PCM, etc. Method 200 may concomitantly attempt to determine whether or not a recent driver, occupant, owner, or other user of the host vehicle has declared that the host vehicle has come to a stop and is at least partially enclosed by a surrounding structure. Without a definitive declaration that the host vehicle is fully or partially surrounded by a nearby structure, the method 200 may attempt to predict whether or not the host vehicle is in an enclosed space. Additional information related to predicting that a host vehicle is located in an at least partially enclosed area may be found, for example, in commonly owned U.S. patent application Ser. No. 17/959,667, which was filed on Oct. 4, 2022, and is incorporated herein by reference in its entirety and for all purposes. If not parked and in a VPES state, method 200 may transition into a standby mode or may temporarily terminate.

After collecting the final maneuver data and confirming the host vehicle is parked and in a VPES state, the method 200 may responsively execute THERMAL EVENT decision block 205 to detect a future (medium-level) thermal event or an active (high-level) thermal event in one or more of the battery cells. In one example, decision block 205 may return a positive result (YES) and set a corresponding fault flag in response to forecasting a predicted onset of a TR event in the vehicle battery system (e.g., a medium-level thermal event) after verifying that the host vehicle is parked and fully or partially enclosed. Additionally, decision block 205 may return a positive result (YES) and set a corresponding fault flag in response to sensing an active TR event in the vehicle battery system (e.g., a high-level thermal event) after verifying that the host vehicle is parked and in VPES. If a thermal event is not detected (Block 205=NO), method 200 may loop to CHECK DELAY process block 207, wait a preset delay time (e.g., one (1) minute), and then loop back to decision block 205 to monitor for a thermal event. This loop may continually repeat until either a thermal event is detected or the host vehicle is shifted into gear, moved, keyed on, or otherwise no longer stationary. It is also within the scope of this disclosure to detect an active or predicted onset of a thermal event in other segments of the vehicle (e.g., in a fuel cell stack, internal combustion engine, fuel tank, etc.).

Upon detection of a thermal event (Block 205=YES), method 200 may responsively execute VEHICLE LOCK signal transmission block 209 and command a door lock system of the host vehicle to lock or retain locked one or more or all of the host vehicle's doors. It may be desirable, for at least some implementations, that the host vehicle 10 concurrently display a notification on the display device 18 of the in-vehicle telematics unit 14 that the doors have been locked and provide a user-selectable option to override the door locks (e.g., for situations in which a person is still inside the passenger compartment). Likewise, the vehicle user may be enabled to override the door locks using their key fob or smartphone (e.g., if a child or pet is still in the vehicle). Method 200 may also respond to detection of a thermal event by executing SOS CALL transaction block 211, at which the host vehicle telematics unit initiates a warning call or otherwise automates transmission of a notification of the thermal event, including active tracking and/or a real-time final location of the host vehicle, to a first responder and/or a BO vehicle service center.

Advancing from transaction block 211 to USER NOTIFICATION transaction block 213, method 200 sends a notification to the owner or possessor of the host vehicle informing them that a thermal event has been detected and thermal event remediation maneuvers will be deployed to mitigate the effects of such event. Continuing with the discussion of the example presented in FIG. 1, the vehicle CPU 36 may respond to detection of a TR event by transmitting an electronic notification of the TR event to a user of the host vehicle 10, e.g., via SMS/MMS text, push, email, automated call, etc. In this instance, the vehicle CPU 36 may thereafter receive an override signal from the user indicating that the user has input an override request to deny execution of the event mitigation maneuvers (e.g., user confirmed false-positive detection of event, vehicle extrication is obstructed or hazardous, etc.). Method 200 may also respond to detection of a thermal event by executing BYSTANDER WARNING signal transmission block 215, which functions to activate one or more vehicle lighting components (e.g., vehicle headlamps, brake lights, turn signals, electronic displays, etc.) and/or one or more vehicle audio components (vehicle horn, passenger-cabin speaker system, etc.) to generate predefined visible and/or audible outputs that alert individuals proximal the host vehicle of the thermal event. The visible and/or audible cues generated by the host vehicle's lighting and/or audio components may also be designed to warn bystanders, pedestrians, first responders, etc., of: (1) the automated extrication of the host vehicle; (2) the automated maneuvering of the host vehicle away from the enclosed parking area; (3) the optimized positioning of the host vehicle at the designated secure location; and/or (4) the automated stopping of the host vehicle at the designated secure location.

With continuing reference to FIG. 2, method 200 may also respond to the initial detection of a thermal event by executing PREPARK DATA RETRIEVAL database block 217 and retrieving from resident/remote memory the final maneuver data that was collected at process block 203. This final maneuver data may be employed, for example, to dynamically derive path plan data for extricating the vehicle, including confirming a vehicle start location, identifying a vehicle end location, and generating a designated route for extricating the host vehicle from the parking area along the designated route from start to end locations. In its simplest form, the path plan data may only contain an optimal end location and a rectilinear or curvilinear path distance for reaching that location.

Before removing the vehicle from the partially or fully enclosed parking area, method 200 may first execute GARAGE DOOR decision block 219 to determine whether or not a garage door, gate, screen, or similar obstruction is presently impeding the path of the subject host vehicle. In one example, the host vehicle may confirm that a garage door is present (or absent) by retrieving such information from a user-specific vehicle profile that was created, for example, during a one-time "new buyer" vehicle registration and setup process. As yet another option, the host vehicle may be originally equipped with an overhead garage door opener module; if this opener was programmed to open a garage door for the parking space associated with the subject vehicle's present location, the host may output a positive (YES) response to decision block 219. Other options may include using the on-vehicle sensor network or retrieving geospatial data for the host vehicle's current real-time position to confirm that a garage door is present (or absent). If there is a garage door (Block 219=YES), method 200 responsively executes OPEN GARAGE transaction block 221 and transmits a wireless (radio) signal to the garage door opener unit to open the garage door.

Responsive to concluding that there is no garage door (Block 219=NO), determining the garage door is open, or opening the garage door (Block 221), method 200 carries out the processor-executable instructions associated with VEHICLE EXTRACTION predefined process block 223. In so doing, the host vehicle extracts itself from the enclosed parking area and relocates to a designated location and/or at least a predefined distance from a domicile or other structure(s) associated with the parking area. For instance, the vehicle CPU 36 of FIG. 1 may transmit a series of (first) command signals to: (1) the EBCM 56 to turn on the traction motor 78; (2) the PCM 52 to shift the vehicle into a reverse driving mode; and (3) the MCM 54 to propel the vehicle 10 away from the parking area along the designated route. For path plan data that contains an optimal end location that is at least a preset minimum number of feet/meters from the parking area, the vehicle CPU 36 may transmit a series of (second) command signals to the Steering Control Module (SCM) 58 to maneuver the vehicle 10 to the optimal end location and to the BSCM 60 to stop the vehicle 10 at the optimal end location. Upon arrival at the optimal end location, the vehicle CPU 36 may transmit a series of (third) command signals to: (1) the Steering Control Module (SCM) 58 to position the host vehicle in a preset optimal orientation (Block 225); (2) the PCM 52 to shift the vehicle powertrain into a neutral or park mode; and (3) the EBCM 56 to power off the vehicle 10 and electrically disconnect the traction battery pack 70 from most/all power loads. Host vehicle extraction may employ pattern-based learning, such as deep neural network (DNN) methods or other machine learning techniques, to optimize path planning and automated vehicle maneuvering. For instance, if the host vehicle enters a parking structure or gated lot using an entry path that cannot be used for exiting the area, the vehicle controller may collect and reference learned path histories to derive a path plan with an exit path for quickly and efficiently exiting the area.

During vehicle extraction, the vehicle controller may receive sensor data indicative of detection of one or more physical obstructions that completely or partially block the vehicle's extraction route. If this is the case, the vehicle controller may responsively command the resident autonomous driving system (e.g., advanced driver assistance system (ADAS) hardware components and modules 16 of FIG. 1) to suspend execution of the vehicle extraction control operations or, alternatively, may output the corresponding command signals to take evasive maneuvers or reroute the host vehicle. In the same vein, the vehicle controller may communicate with the on-vehicle network of vehicle sensors to collect sensor data that is indicative of target objects proximate the host vehicle after being extricated from the parking area. To avoid inadvertent damage to these target objects, the controller may dynamically determine a new optimal end location or adjust a predetermined optimal end location based, at least in part, on this sensor data.

Advancing from process block 223 to OPTIMUM POSITION process block 225, method 200 provides processor-executable instructions for the host vehicle to orient itself in an optimal position, for example, to enable first responders to access the traction battery pack, flood port, etc. When establishing the path plan data for vehicle extraction, the method 200 may dynamically derive an optimal orientation at which the vehicle battery system is accessible when the host vehicle is stopped at the optimal end location. Recognizably, if the vehicle is stopped in an open field, street, lot, etc., there is likely no need to determine an optimal vehicle orientation. Conversely, if the end location has building, vehicles, or other structural obstructions that may impede access to the vehicle battery, battery system, flood port, etc., it may be desirable to position the host vehicle in a manner that simplifies first-responder access to select portions of the vehicle.

At CONGESTED AREA predefined process block 227, the host vehicle evaluates whether or not the host vehicle is located in a congested area (e.g., parked on a busy street) or in an urban setting (e.g., parked in a major city). If applicable, the vehicle's autonomous driving system may be programmed to move the host vehicle to a designated secure location based on a geographic location outside the congested area/urban setting. In a non-limiting example, vehicle CPU 36 may receive vehicle data, such as real-time or near-real time geolocation and geospatial data that indicates the enclosed parking area is in an urban or congested area. Responsively, the CPU 36 may generate path plan data with an optimal end location that is a designated secure location outside a predefined proximity of the urban or congested area (e.g., one mile past city limits). Optional FIRST RESPONDER LOCATION predefined process block 229 enables the host vehicle to automate driving of the vehicle to the nearest first responder location (e.g., fire department, police department etc.) to decrease the response time for the first responders. It may be desirable to activate the host vehicle's hazard lights and provide other visible/audible cues (honk horn and flash headlamps) to warn nearby pedestrians and third-party vehicles that the host vehicle is experiencing a sever thermal event and, where possible, should be avoided. It is envisioned that method 200 may omit process block 227 and/or process block 229, may combine process block 227, 229 into a single process block, or may combine them into process block 223. At CONFIRMATION transaction block 231, method 200 commands the in-vehicle telematics unit to send confirmation of extraction and updated vehicle location data to the vehicle user and any other interested parties.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a host vehicle having a vehicle controller, a vehicle battery system with multiple battery cells, and an autonomous driving system, the method comprising:

determining, via the vehicle controller, the host vehicle is in a parked state;

receiving, via the vehicle controller responsive to determining the host vehicle is in the parked state, vehicle data indicating the host vehicle is in a vehicle parked in enclosed space (VPES) state in which the host vehicle is at least partially enclosed in a parking area;

detecting, via the vehicle controller after determining the host vehicle is in both the parked state and the VPES state, a predicted onset or an occurrence of a thermal event in at least one of the battery cells of the vehicle battery system;

determining, via the vehicle controller responsive to detection of the thermal event, path plan data with a designated route for extricating the host vehicle from the parking area and an optimal end location at least a preset minimum distance from the parking area;

transmitting, via the vehicle controller, a first command signal to the autonomous driving system to execute a first vehicle control operation maneuvering the host vehicle away from the parking area along the designated route of the path plan data; and transmitting, via the vehicle controller, a second command signal to the autonomous driving system to execute a second vehicle control operation stopping the host vehicle at the optimal end location of the path plan data.

2. The method of claim 1, further comprising:

storing, via a memory device prior to the host vehicle being in the parked state, final maneuver data indicative of driving maneuvers executed via the host vehicle to park in the parking area; and retrieving, via the vehicle controller responsive to detection of the thermal event, the final maneuver data from the memory device, wherein determining the path plan data is based, at least in part, on the final maneuver data.

3. The method of claim 1, further comprising transmitting, via the vehicle controller responsive to detection of the thermal event, a lock signal to a door lock system of the host vehicle to lock or retain locked multiple vehicle doors of the host vehicle.

4. The method of claim 1, further comprising:
receiving, via the vehicle controller prior to executing the first vehicle control operation, sensor data indicative of detection of a garage door of the parking area; and
transmitting, via the vehicle controller responsive to detection of the garage door, an open signal to a garage door opener to open the garage door.

5. The method of claim 1, further comprising:
receiving, via the vehicle controller, sensor data indicative of detection of a physical obstruction at least partially blocking the designated route; and
transmitting, via the vehicle controller responsive to detection of the physical obstruction, a suspend signal to the autonomous driving system to suspend execution of the first vehicle control operation.

6. The method of claim 1, wherein determining the path plan data further includes determining an optimal orientation at which the vehicle battery system is accessible when the host vehicle is stopped at the optimal end location, the method further comprising transmitting, via the vehicle controller, a third command signal to the autonomous driving system to execute a third vehicle control operation positioning the host vehicle in the optimal orientation when stopped at the optimal end location.

7. The method of claim 1, wherein the received vehicle data includes geospatial data indicating the parking area is in an urban or congested area, and wherein the optimal end location is a designated secure location outside a predefined proximity of the urban or congested area.

8. The method of claim 1, wherein determining the path plan data with the optimal end location includes:
receiving, via the vehicle controller from an on-vehicle network of vehicle sensors, sensor data indicative of target objects proximate the host vehicle after being extricated from the parking area; and
dynamically determining the optimal end location based, at least in part, on the received sensor data.

9. The method of claim 1, further comprising:
transmitting, via the vehicle controller responsive to detection of the thermal event, an electronic notification of the thermal event to a user of the host vehicle; and
receiving, via the vehicle controller, an override signal indicative of an override input from the user of the host vehicle to deny execution of the first vehicle control operation by the autonomous driving system.

10. The method of claim 1, wherein the thermal event includes a thermal runaway event in which the at least one of the battery cells is in an uncontrolled heat-generating cycle causing an unstable self-heating state.

11. The method of claim 1, further comprising transmitting, via the vehicle controller responsive to detection of the thermal event, an activation signal to a lighting component and/or an audio component of the host vehicle to generate a predefined visible and/or audible output alerting individuals proximal the host vehicle of the thermal event and the maneuvering of the host vehicle via the vehicle controller.

12. The method of claim 1, further comprising transmitting, via the vehicle controller responsive to detection of the thermal event, a warning signal to a telematics unit of the host vehicle to automate transmission of a notification of the thermal event and a real-time location of the host vehicle to a first responder or a remote vehicle service center.

13. A non-transitory, computer-readable medium storing instructions executable by one or more processors of a vehicle controller of a host vehicle, the host vehicle including an autonomous driving system and a vehicle battery system, the instructions, when executed by the one or more processors, causing the vehicle controller to perform operations comprising:
determining the host vehicle is in a parked state;
receiving, responsive to determining the host vehicle is in the parked state, vehicle data indicating the host vehicle is in a vehicle parked in enclosed space (VPES) state in which the host vehicle is at least partially enclosed in a parking area;
detecting, after determining the host vehicle is in both the parked state and the VPES state, a predicted onset or an occurrence of a thermal event in the host vehicle;
determining, responsive to detection of the thermal event, path plan data with a designated route for extricating the host vehicle from the parking area and an optimal end location at least a preset minimum distance from the parking area;
commanding the autonomous driving system to execute a first vehicle control operation maneuvering the host vehicle away from the parking area along the designated route; and
commanding the autonomous driving system to execute a second vehicle control operation stopping the host vehicle at the optimal end location.

14. A motor vehicle, comprising:
a vehicle body;
a plurality of drive wheels rotatably attached to the vehicle body;
a traction motor attached to the vehicle body and operable to drive one or more of the drive wheels to thereby propel the motor vehicle;
a vehicle battery system with multiple battery cells attached to the vehicle body and operable to power the traction motor;
an autonomous driving system attached to the vehicle body and operable to automate vehicle control operations; and
a vehicle controller programmed to:
determine the motor vehicle is in a parked state;
responsive to determining the motor vehicle is in the parked state, receive vehicle data indicating the motor vehicle is in a vehicle parked in enclosed space (VPES) state in which the motor vehicle is at least partially enclosed in a parking area;
after determining the motor vehicle is in both the parked state and the VPES state, detect a predicted onset or an occurrence of a thermal event in at least one of the battery cells of the vehicle battery system;
responsive to detection of the thermal event, determine path plan data with a designated route for extricating the motor vehicle from the parking area and an optimal end location at least a preset minimum distance from the parking area;
transmit a first command signal to the autonomous driving system to execute a first vehicle control operation maneuvering the motor vehicle away from the parking area along the designated route; and
transmit a second command signal to the autonomous driving system to execute a second vehicle control operation stopping the motor vehicle at the optimal end location of the path plan data.

15. The motor vehicle of claim 14, wherein the vehicle controller is further programmed to:
   store, in a memory device of the motor vehicle, final maneuver data indicative of driving maneuvers executed via the motor vehicle to park in the parking area; and
   responsive to detection of the thermal event, retrieve the final maneuver data from the memory device, wherein determining the path plan data is based, at least in part, on the final maneuver data.

16. The motor vehicle of claim 14, wherein the vehicle controller is further programmed to transmit, responsive to detection of the thermal event, a lock signal to a door lock system of the motor vehicle to lock or retain locked multiple vehicle doors of the motor vehicle.

17. The motor vehicle of claim 14, wherein the vehicle controller is further programmed to:
   receive, prior to executing the first vehicle control operation, sensor data indicative of detection of a garage door of the parking area; and
   responsive to detection of the garage door, transmit an open signal to a garage door opener to open the garage door.

18. The motor vehicle of claim 14, wherein determining the path plan data further includes determining an optimal orientation at which the vehicle battery system is accessible when the motor vehicle is stopped at the optimal end location, and wherein the vehicle controller is further programmed to transmit a third command signal to the autonomous driving system to execute a third vehicle control operation positioning the motor vehicle in the optimal orientation when stopped at the optimal end location.

19. The motor vehicle of claim 14, wherein determining the path plan data with the optimal end location includes:
   receiving, from an on-vehicle network of vehicle sensors, sensor data indicative of target objects proximate the host vehicle after being extricated from the parking area; and
   dynamically determining the optimal end location based, at least in part, on the received sensor data.

20. The motor vehicle of claim 14, wherein the vehicle controller is further programmed to receive, from a user of the motor vehicle, an override signal indicative of an override input preventing the motor vehicle from executing the first vehicle control operation by the autonomous driving system.

* * * * *